United States Patent [19]

Riley

[11] 4,289,334

[45] Sep. 15, 1981

[54] SOCKET CONNECTION FOR AN ENAMELLED VESSEL

[75] Inventor: Harry J. Riley, Wembley, Australia

[73] Assignee: S. W. Hart & Co. Pty. Ltd., Welshpool, Australia

[21] Appl. No.: 98,417

[22] Filed: Nov. 28, 1979

[30] Foreign Application Priority Data

Sep. 6, 1979 [JP] Japan .................................. 54/114693

[51] Int. Cl.³ .............................................. F16L 41/00
[52] U.S. Cl. ..................................... 285/55; 285/158; 285/173; 285/286; 285/351; 285/357
[58] Field of Search ............... 285/212, 220, 173, 158, 285/55 (U.S. only), 55, 357, 351

[56] References Cited

U.S. PATENT DOCUMENTS

| | | | |
|---|---|---|---|
| 524,754 | 8/1894 | Chable | 285/212 X |
| 689,630 | 12/1901 | Autenrieth | 285/219 X |
| 986,164 | 3/1911 | Glennan | 285/173 |
| 2,361,636 | 10/1944 | Koppel | 285/286 X |
| 2,452,262 | 10/1948 | Rosan | 285/212 X |
| 2,630,338 | 3/1953 | Snyder | 285/212 X |
| 3,212,796 | 10/1965 | Neuschotz | 285/212 X |
| 3,307,860 | 3/1967 | Blount et al. | 285/55 |
| 3,336,054 | 8/1967 | Blount et al. | 285/55 |
| 3,858,911 | 1/1975 | Martin | 285/173 |
| 3,894,757 | 7/1975 | Best | 285/286 X |

*Primary Examiner*—Thomas F. Callaghan

[57] ABSTRACT

The present invention relates to a steel socket connection for an internally enamelled steel vessel in which presentation of bare ferrous metal to the contents of the vessel is reduced to a minimum. The socket comprises a parallel portion adjacent the vessel, an internally threaded portion remote from the vessel and a seat located between the parallel and threaded portions, said steel socket being internally enamelled except for the internally threaded portion thereof.

3 Claims, 1 Drawing Figure

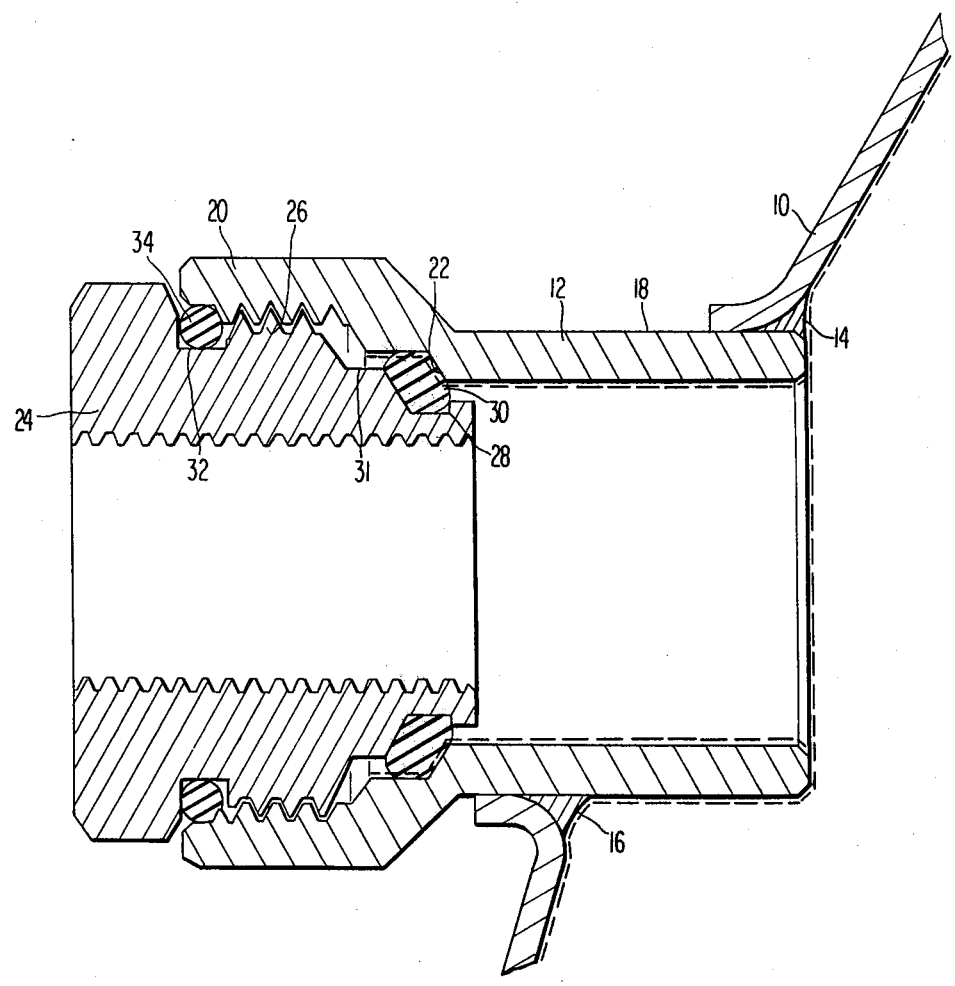

SOCKET CONNECTION FOR AN ENAMELLED VESSEL

The present invention relates to a socket connection for an enamelled steel vessel in which there is little or no bare ferrous metal presentation to the contents of the vessel. In the past, it has been customary to projection weld steel pipe sockets to holes cut in steel vessels and, with a spray application, to enamel the vessel up to the threaded portion of the socket. However, there is a need for a fitting which will reduce bare ferrous metal presentation to the contents of the vessel, particularly where a dip or vacuum type enamelling process is used, as for solar hot water storage vessels.

In accordance with the present invention there is provided an internally enamelled steel vessel having a steel socket welded thereto, wherein the steel socket comprises a parallel portion adjacent the vessel, an internally threaded portion remote from the vessel and a seat located between the parallel and threaded portions, said steel socket being internally enamelled except for the internally threaded portion thereof.

The steel socket is welded to the vessel prior to enamelling. In the enamelling process the interior of the vessel is coated with a layer of enamel composition through an appropriate aperture. A blanking plug is inserted in the socket to protect the internally threaded portion from the enamel. After completion of enamelling, any excess material may be removed from the socket under gravity through the blanking plug, such as by removing a core plug therefrom. Subsequently the vessel is heated to dry the enamel coating, and then the blanking plug is removed. Then the vessel is heated to glaze the enamel coating.

Thus, the steel socket is enamelled in the parallel portion and the seat thereof, but not in the internally threaded portion thereof.

A further non-ferrous socket which may be made of brass is inserted in the steel socket after enamelling. The non-ferrous socket has an external thread matching the internal thread of the steel socket and an O-ring groove. An O-ring seal is fitted in the O-ring groove such that when the non-ferrous socket is inserted in the steel socket the O-ring seal is compressed against the seat in the steel socket. Thus, the O-ring seal forms a seal preventing the contents of the vessel from contacting the non-enamelled internal threaded portion of the steel socket.

The present invention will now be described, by way of example, with reference to the accompanying drawing which is a fragmentary schematic sectional view through a steel vessel fitting with a socket in accordance with the present invention.

In the drawing, there is shown a steel vessel 10 (only part of which can be seen) having welded thereto a steel socket 12. The welded connection between the vessel 10 and socket 12 is formed internally of the vessel as shown at 14 and 16. The steel socket 12 comprises a parallel portion 18 adjacent the steel vessel 10 and an internally threaded portion 20 remote from the steel vessel 10.

An angled seat 22 is located between the parallel portion 18 and the threaded portion 20.

In manufacture, as described above, the steel vessel 10 is internally enamelled with a vitreous enamel and the enamel layer extends into the socket 12 as far as the seat 22. A hexagonal headed brass socket 24 is inserted within the steel socket 12. The brass socket 24 comprises an externally threaded portion 26 with threads matching those of the internally threaded portion of the socket 12. The brass socket 24 further comprises an O-ring groove 28 in which is fitted an O-ring seal 30. There is also a short parallel portion 31 in the brass socket 24 between the threaded portion 26 and the O-ring groove 28. As shown, the brass socket 24 is inserted into the steel socket 12 until the O-ring seal 30 is compressed against the seat 22 to a predetermined extent. This forms a seal which prevents the contents of the vessel 10 from contacting the non-enamelled threaded portion 20.

The brass socket 24 shown in the drawing is also internally threaded and is arranged to mount a sacrificial anode which is located within the vessel 10 to inhibit corrosion of the vessel 10. However, the steel socket of the present invention is of general applicability in mounting members such as pipes to steel vessels.

The brass socket 24 further comprises an additional O-ring groove 32 between the hexagonal head and threaded portion 26 thereof. The groove 32 contains an O-ring seal 34 which fits into a short section of the steel socket 12 prior to commencement of the internal thread thereof to provide a seal against atmospheric corrosion. Thus, the internally threaded portion 20 is protected against external corrosion allowing easy removal of connections if this is necessary at any time. Modifications and variations such as would be apparent to one skilled in the art are deemed within the scope of the present invention. For example, the steel socket 12 could be provided with a further parallel portion and seat between the internally threaded portion 20 and the seat 22. The additional seat is located adjacent the internally threaded portion 20 and enables a rubber sealing cup to be seated. In this way the steel socket 12 becomes enamelled in the seat 22 and the further parallel portion. Thus, the enamel extends beyond the O-ring seal 30 and provides a margin of safety in the event that the edge of the enamel layer is defective in any way.

I claim:

1. An internally enamelled steel vessel having a steel socket welded thereto, wherein said steel socket comprises
    (a) a parallel portion adjacent said vessel;
    (b) an internally threaded portion remote from said vessel; and
    (c) a seat located between said parallel and threaded portions;
    (d) said steel socket being internally enamelled except for said internally threaded portion thereof;
    (e) a further, non-ferrous socket having an externally threaded portion having a thread matching the internal thread of said steel socket, and an external O-ring groove containing an O-ring seal, said O-ring seal being sealingly compressed against said seat in the said steel socket, said O-ring groove being located forwardly of said externally threaded portion of said non-ferrous socket so that the internal enamel of said steel socket extends outwardly of said O-ring groove and the seal formed by said O-ring seal.

2. A steel vessel as claimed in claim 1, wherein said non-ferrous socket is internally threaded to provide a mounting for a sacrificial anode to be located in said vessel.

3. A steel vessel as claimed in claim 1, wherein said non-ferrous socket comprises a further external O-ring groove containing an O-ring seal which sealingly engages with an outer portion of said steel socket to protect the internal thread of said steel socket against atmospheric corrosion.

* * * * *